(12) United States Patent
Tormen

(10) Patent No.: US 6,553,163 B2
(45) Date of Patent: Apr. 22, 2003

(54) METHOD AND APPARATUS FOR WRITING A BRAGG GRATING IN A WAVEGUIDE

(75) Inventor: Maurizio Tormen, Belluno (IT)

(73) Assignee: Corning, Incorporated, Corning, NY (US)

(*) Notice: Subject to any disclaimer, the term of this patent is extended or adjusted under 35 U.S.C. 154(b) by 64 days.

(21) Appl. No.: 09/820,345

(22) Filed: Mar. 29, 2001

(65) Prior Publication Data
US 2001/0043774 A1 Nov. 22, 2001

Related U.S. Application Data
(60) Provisional application No. 60/194,397, filed on Apr. 4, 2000.

(30) Foreign Application Priority Data
Mar. 30, 2000 (EP) .............................. 00201173

(51) Int. Cl.$^7$ .............................. G02B 6/34
(52) U.S. Cl. .......................... 385/37; 438/32
(58) Field of Search ................ 385/37; 438/32

(56) References Cited

U.S. PATENT DOCUMENTS

| | | | | |
|---|---|---|---|---|
| 5,619,603 A | * | 4/1997 | Epworth et al. | 385/37 |
| 5,655,040 A | * | 8/1997 | Chesnoy et al. | 385/37 |
| 5,912,999 A | * | 6/1999 | Brennan et al. | 359/569 |
| 5,914,207 A | * | 6/1999 | Nishiki et al. | 385/147 |
| 5,945,261 A | * | 8/1999 | Rourke | 385/37 |
| 6,072,926 A | * | 6/2000 | Cole et al. | 385/37 |
| 6,169,830 B1 | * | 1/2001 | Kewitsch et al. | 385/37 |
| 6,178,045 B1 | * | 1/2001 | Cook et al. | 359/559 |
| 6,201,910 B1 | * | 3/2001 | Boschis et al. | 385/123 |
| 6,201,911 B1 | * | 3/2001 | Jang | 385/11 |
| 6,269,208 B1 | * | 7/2001 | Bhatia et al. | 359/559 |
| 6,310,996 B1 | * | 10/2001 | Byron | 385/37 |

FOREIGN PATENT DOCUMENTS

| | | | |
|---|---|---|---|
| EP | 0 684 491 A1 | 11/1995 | |
| EP | 0 721 118 A1 | 7/1996 | |
| EP | 09030415 | 8/1998 | |
| GB | 2289770 | 11/1995 | |
| GB | 2 289 770 A | 11/1995 | ............ G02B/6/00 |
| WO | WO 98/08120 | 2/1998 | |
| WO | WO 99/22256 | 5/1999 | |
| WO | WO 00/02068 | 1/2000 | |
| WO | WO 00/11509 | 3/2000 | |
| WO | WO 00/29884 | 5/2000 | |

OTHER PUBLICATIONS

Loh, W.H., Cole, M.J., Zervas, M.N. and Laming, R.I. "Compensation of imperfect phase mask with moving fibre–scanning beam technique for production of fibre gratings", Electronics Letters, 1995, 31, (17), pp. 1483–1485.*
Erdogan, T., "Fiber Grating Spectra", Journal of Lightwave Technology, vol. 15, No. 8, pp. 1277–1294, 1997.
Albert, J. et al., "Apodisation of the Spectral Response of Fibre Bragg Gratings Using a Phase Mask with Variable Diffraction Efficiency", Electronics Letters, vol. 31, No. 3, pp. 222–223, 1995.
Fröhlich, H.G. et al., "Two Methods of Apodisation of Fibre–Bragg–Gratings", Optics Communications, 157, pp. 273–281, 1998.

(List continued on next page.)

Primary Examiner—Robert H. Kim
Assistant Examiner—Krystyna Suchecki
(74) Attorney, Agent, or Firm—Svetlana Shout; Kevin A. Oliver

(57) ABSTRACT

In order to create a diffraction grating in an optical fiber with a predetermined pattern of the refractive index, an ultraviolet radiation beam (3) is scanned (5, 8) along a phosensitive portion (F') of the fiber through a phase mask (9) and, during the scan, the beam intensity (4) and the mask-fiber distance (10) are controlled moment by moment in such a way as to obtain the desired patterns of the mean value and of the envelope of the refractive index, respectively.

16 Claims, 8 Drawing Sheets

OTHER PUBLICATIONS

Hübner, M.S. et al., "Phenomenological Model of UV–Induced Bragg Grating Growth in Germanosilicate Fibers", SPIE vol. 2998, pp. 10–21.

Malo, B. et al., "Apodised in–fibre Bragg Grating Reflectors Photoimprinted Using a Phase Mask", Electronics Letters, vol. 31, No. 3, pp. 223–225, 1995.

Cole, M.J. et al., "Moving Fibre/Phase Mask–Scanning Beam Technique for Enhanced Flexibility in Producing Fibre Gratings with Uniform Phase Mask", Electronics Letters, vol. 17, No. 3, pp. 1488–1489, 1995.

Korenori, T., "Optical Waveguide Formed of Low–Reflection Grating and Its Manufacture", Patent Abstracts of Japan, JP No. 10–227908, Aug. 25, 1998, (1 page).

Erdogan, T., "Fiber Grating Spectra", Journal of Lightwave Technology, vol. 15, No. 8, pp. 1277–1294, 1997.

Albert, J. et al., "Apodisation of the Spectral Response of Fibre Bragg Gratings Using a Phase Mask with Variable Diffraction Efficiency", Electronics Letters, vol. 31, No. 3, pp. 222–223, 1995.

* cited by examiner

METHOD AND APPARATUS FOR WRITING A BRAGG GRATING IN A WAVEGUIDE

This application claims the priority of EP00201173.2, filed Mar. 30, 2000, and the benefit of U.S. Provisional application No. 60/194,397, filed Apr. 4, 2000, the content of both of which is incorporated herein by reference.

The present invention relates to a method and apparatus for creating a Bragg grating in a waveguide, in particular an apodised Bragg grating.

In this description, reference shall be made to optical fibres, but this reference shall be intended as a matter of example only and not as a limitation, since the technology described is equally applicable also to integrated optical waveguides.

BACKGROUND OF THE INVENTION

Typically, the optical fibres used for telecommunications are doped with germanium, which induces a photosensitivity property to the UV radiation. To write a Bragg grating in an optical fibre, this property is used to locally modify the refractive index through UV illumination.

As known, an optical fibre Bragg diffraction grating is a portion of fibre which has, in its core, an essentially periodic longitudinal modulation of the refractive index. Said structure has the property of back reflecting the light passing through it in a wavelength band centered around the Bragg wavelength. The Bragg wavelength, as known (for example, from the relation 3.3 of the text "Fiber Bragg Gratings", Andreas Othonos, Kyriacos Kalli, Artech House, Boston/London, 1999), can be expressed as follows:

$$\lambda_B = 2 \cdot n_{eff} \cdot \Lambda \quad (1)$$

where $n_{eff}$ is the effective refractive index and $\Lambda$ is the spatial period of the diffraction grating.

Moreover, as known (for example, from the relation 3.4 of the above text "Fiber Bragg Gratings"), the pattern of the refractive index n along axis z of the fibre core can be expressed by the following relation (wherein all of the possible dependencies from variable z are shown):

$$n(z) = n_0(z) + \Delta n(z) \sin(2\pi z/\Lambda(z)) \quad (2)$$

where $n_0(z)$ is the mean local value of the refractive index and $\Delta n(z)$ represents the local envelope of the refractive index. The effective refractive index $n_{eff}$ is proportional to the mean refractive index $n_0(z)$ through a term defining the confinement factor (typically indicated with $\Gamma$) of the fundamental mode of the fibre.

On the basis of the pattern of the refractive index, uniform gratings, so-called "chirped" gratings and apodised gratings are known.

In uniform gratings, the terms $n_0(z)$, $\Delta n(z)$ and $\Lambda(z)$ are constant, as shown in FIG. 1a, wherein there is represented the typical pattern of the refractive index n (normalised to 1) as a function of the z coordinate (expressed in arbitrary units). Moreover, as shown in FIG. 1b, the reflection spectrum of a uniform grating typically exhibits a central peak at the Bragg wavelength, and a plurality of secondary lobes. Said secondary lobes can be disadvantageous in some applications, for example when the Bragg grating is used to filter a channel (at a respective wavelength) in a multi-channel optical transmission system. In this case, in fact, the secondary lobes of the reflection spectrum introduce an undesired attenuation into the transmission channels adjacent that to be filtered.

In apodised gratings, the pattern of the refractive index n(z) is of the type qualitatively shown in FIG. 2a (wherein n is normalised to 1 and z is expressed in arbitrary units). As it can be noted, the term $\Delta n(z)$ is suitably modulated in order to have a reduction of the above-mentioned secondary lobes. A typical pattern of the reflection spectrum of an apodised grating is illustrated in FIG. 2b. The reduction of the secondary lobes around the main reflection peak is evident. Such a grating can thus be advantageously used for filtering a channel in a multi-channel system, reducing the above-mentioned problem of the attenuation of the channels adjacent that filtered.

In chirped gratings, either of the terms $n_0(z)$ and $\Lambda(z)$ is variable. Due to this variability, and due to the fact that—according to what said before—the Bragg wavelength is proportional to the product between $n_0(z)$ and $\Lambda$, said gratings have a broader reflection band with respect to uniform gratings. FIGS. 3a, 3b and 3c respectively show the qualitative pattern of the refractive index in the case the term $n_0(z)$ is modulated, and in the case the term $\Lambda(z)$ is modulated (for example, with a continuous variation from about 500 nm to about 502 nm), as well as the typical reflection spectrum of a chirped grating. As it can be noted from the spectrum of FIG. 3c, the reflection peak is significantly broadened. Such a grating can thus be used as wideband reflection filter or, more typically, as a device for compensating the chromatic dispersion. If, in addition, also the term $\Delta n(z)$ is modulated, the grating will be of the apodised chirped type.

The international patent application WO 00/29884 in the name of The University of Sidney describes an arrangement for writing a grating in a photosensitive optical fibre. A UV light from a UV light source impinges on an aperture mask which is in the form of a series of spaced apart lines, the lines being opaque to UV lights. The UV light passes between the gaps in the aperture mask and is imaged by a lens having a focal length. The fibre is placed near the focal point and the aperture mask is imaged on the photosensitive fibre so as to form a grating structure. The position of the fibre can be moved forward and backwards so as to alter the periodicity of the grating (i.e. the image size)

Various techniques for writing an apodised Bragg grating are known. According to these techniques, the fibre is exposed to suitably shaped UV interference fringes so as to obtain a corresponding pattern of the refractive index, in particular of the local envelope $\Delta n(z)$.

The current techniques can substantially be divided into two categories: that of interferometric techniques, and that of phase masks.

Interferometric techniques essentially consist in splitting a UV beam into two components, and in causing them to impinge onto the fibre at a predetermined relative angle so as to generate the interference fringes that induce the desired variation of the refractive index. These techniques are very versatile because by changing the relative angle between the two components, it is possible to change the grating parameters, in particular its period.

Nevertheless, interferometric techniques are not very suitable for mass production since the writing set-up is particularly sensitive to external agents (temperature, vibrations, etc.); thus, it requires several interventions for re-aligning the components. Therefore, their application is essentially limited to the research field.

Examples of interferometric techniques are provided, for example, in the article by Fröhlich and Kashyap, *"Two methods of apodisation of fibre-Bragg-gratings"*, Optics Communications, 157, 1998, 273–281.

Phase-mask techniques are generally deemed as more suitable for large-scale production due to a high repeatability, a lower susceptibility to mechanical vibrations, and to the fact that UW beams require a shorter coherence length.

A phase mask is a quartz substrate on a face of which there is, along a main direction, a series of rectilinear ridges parallel to one another, which define, in section, a substantially square-wave pattern. Typically, said ridges are equally spaced and of equal height in the case of a uniform mask, with variable pitch in the case of a chirped mask, and with variable height in the case of an apodised mask.

For writing the grating, the phase mask is usually arranged in front of the portion of fibre concerned, oriented so that its main direction (as defined above) is parallel to the fibre axis. When passed through by the UV radiation, the phase mask generates, at the output, interference fringes with a substantially sinusoidal pattern and with a period $\Lambda$ equal to half the period $\Lambda_m$ of the ridges of the mask itself. More in detail, at the output of the phase mask there are different orders associated to respective angles according to the following relation:

$$\sin\theta_m = m\frac{\lambda}{\Lambda} \quad (3)$$

The above-mentioned fringes are generated starting from the +1 and −1 orders (values +1 and −1 of m), whereas the other orders, in particular the zero order, are undesired since they tend to lower the visibility v of the fringes. The latter is defined, in first approximation, by the following relation:

$$v = \frac{I_{max} - I_{min}}{I_{max} + I_{min}} \quad (4)$$

where $I_{max}$ and $I_{min}$ are the peak and valley intensity of the fringes, respectively.

In general, phase masks are designed in such a way as to reduce (typically between about 1% and 3%) the transmitted zero order, and maximise (typically between about 30% and 40%) the amount of light in +1 and −1 orders.

The article by J. Hübner, M. Svalgaard, L. G. Nielsen and M. Kristensen, "Phenomenological Model of UV-induced Bragg Grating Growth in Germanosilicate Fibers", SPIE Vol. 2998, presents a model for the growth behaviour of Bragg gratings in a germanosilicate fibre when the phase-mask technique is used. The authors of said article have carried out experiments by illuminating the fibre with an excimer laser (of the ArF or KrF type), or a frequency doubled argon ion laser (FRED). In the case of excimer laser, the laser beam was shaped by two cylindrical lenses so as to have a section of a size equal to the length of the grating to be written; the fibre was arranged in a central position with respect to the beam, and the phase mask was arranged in contact with the fibre. In the case of FRED laser, the beam was shaped by a cylindrical lens on a line parallel to the fibre axis, and the phase mask was arranged at about 100 μm from the fibre.

The international application WO 99/22256 relates to an optical grating fabrication apparatus comprising a phase mask for dividing an incident light beam into a plurality of diffracted beams; and a focusing arrangement for receiving light from the phase mask and converging at least two non-zero-order diffracted beams together so as to generate an interference region between the converged beams so that a grating structure can be impressed on an optical waveguide placed in the interference region; the phase mask and at least a part of the focusing arrangement being moveable with respect to one another so as to alter the angle of convergence of the converged beams.

A phase mask can be used for writing apodised gratings. Some examples of known techniques for writing apodised gratings through phase mask are described hereinafter.

A first technique consists in using apodised phase masks, which have a variable diffraction efficiency; in this technique, contrary to what generally happens, variations of intensity of the beams of −1 and +1 orders are used for modulating, according to the desired apodisation profile, the visibility of the fringes along the fibre axis. The article by Albert et al., "*Apodisation of the spectral response of fibre Bragg gratings using a phase mask with variable diffraction efficiency*", Electronics Letters, Vol. 31, No. 3, 1995, p. 222–225, describes for example the creation of apodised gratings with said technique. In particular, said article proposes the production of apodised masks wherein the ridge depth is variable.

The Applicant believes that even though this technique allows a relatively high repeatability and a relatively easy actuation, it is very unflexible as relates to the obtainable apodisation profile, as the latter is fixed by the shape of the phase mask. Moreover, the Applicant has noted that apodised phase masks are very expensive, and more subject to damage than the other mask types.

A second technique, presented in the article by Malo et al., "*Apodised in-fibre Bragg grating reflectors photoimprinted using a phase mask*", Electronics Letters, Vol. 31, No. 3, p. 223–225, 1995, consists in creating an apodised grating through a double exposure that allows obtaining a substantially constant mean value of the refractive index. The first exposure is made with an amplitude mask with variable transmissivity along a main axis thereof according to the desired apodisation profile, and the subsequent exposure is made with a periodic phase mask together with a second amplitude mask with transmissivity complementary to the first one.

As regards to this technique, the Applicant believes that—since two subsequent exposures are provided and since the increase in the refractive index as a function of the irradiating energy is not linear—the mean refractive index obtained at the end of the double exposure can turn out to be not very uniform along the fibre axis.

The international patent application WO98/08120 by PIRELLI CAVI E SISTEMI S.P.A. describes a technique defined "Continuous Fiber Grating Technique", wherein a fibre, exposed through a mask to a UV radiation periodically time modulated, is continuously translated along its axis (by a translation stage controlled by an interferometric system) so that subsequent exposures produce overlapped fringes. Causing a dithering of the writing position on the fibre, said technique allows creating an apodised grating.

Even though this technique exhibits a high flexibility degree with respect to the obtainable apodisation profiles, it requires an expensive apparatus.

The article by Cole et al., "*Moving fibre/phase mask-scanning beam technique for enhanced flexibility in producing fibre gratings with uniform phase mask*", Electronic Letters, Vol. 31, No. 17, p. 1488–1489, 1995, describes a technique for writing apodised gratings that, besides providing for the scanning of a laser beam in parallel to the fibre axis, and its passage through a phase mask facing the fibre itself, also provides for a relative displacement between fibre and mask in parallel to the fibre axis. The speed of fibre-mask relative displacement is much slower than the scanning speed of the laser beam. By controlling said relative displacement, it is possible to obtain chirped, apodised and phase-shifted gratings.

U.S. Pat. No. 5,912,999 describes a method for writing relatively long gratings wherein the fibre is displaced longitudinally at a controlled speed with respect to the mask and, for creating apodised gratings, the illuminating laser beam is amplitude modulated.

As regards this technique, the Applicant believes that the modulation of the energy induces a modulation of the mean refractive index $n_0(z)$ and, consequently, the growth of undesired lobes at shorter wavelengths with respect to the central one.

EP 0684491 describes a method for writing Bragg gratings, wherein the fibre is illuminated with interference fringes generated by the passage of electromagnetic radiation through a phase mask oriented so as to have its diffractive elements inclined at a predetermined angle (typically, a right angle) with respect to the fibre axis. During the writing, the spacing between the phase mask and the fibre is progressively changed, by a piezoelectric, according to a ramp pattern. This relative movement, in the range of dozens of micrometers, is caused in order to reduce the sensitivity of the grating writing to the spacing between the phase mask and the fibre.

The Applicant notes that said method does not make any apodisation of the grating. Moreover, the Applicant notes that the displacements provided by said technique, that is to say, up to at most 50 $\mu$m, are not sufficient for a significant modification of the fringe visibility. Thus, such a displacement only allows an averaging operation of the interference fringes.

The international patent application WO 00/02068 in the name of Corning Incorporated describes a system for making an optical filter in an optical waveguide medium, comprising a spatial filter that extends spatial coherence of a beam emitted from a source of actinic radiation, and a phase mask that converts the spatially coherent beam into two interfering beams that illuminate the optical waveguide medium within the extended spatial coherence of the beam for producing index modulations in the medium, the phase mask being spaced from the optical waveguide medium by a distance that separates peak intensities of the interfering beams along the optical waveguide medium and that levels combined intensities of the interfering beams within a range of overlap between the interfering beams along the optical waveguide medium.

The Applicant faced the problem of providing a technique for writing a Bragg grating in a waveguide, in particular an apodised Bragg grating, which should allow generating gratings with desired spectral characteristics (that is to say, gratings with a predetermined pattern of the refractive index) with a high process flexibility, high repeatability, and which should not require high-precision alignments or expensive equipment.

BRIEF SUMMARY OF THE INVENTION

The Applicant has found a technique that meets the above requirements, comprising the steps of scanning an ultraviolet radiation beam along a photosensitive portion of the waveguide through a phase mask directly facing said waveguide portion and, during the scan, changing in a controlled way the mask-guide distance so as to obtain the desired pattern of the envelope of the refractive index. Moreover, by changing in a controlled way also the intensity of the beam, it is possible to obtain the desired pattern of the mean value of the refractive index.

In a first aspect thereof, the present invention relates to a method for writing a Bragg grating in a waveguide, comprising the steps of:

providing a photosensitive waveguide portion in a writing position;

generating an ultraviolet radiation beam; and scanning said beam along a z axis of said photosensitive waveguide portion through a phase mask directly facing said photosensitive waveguide portion and adapted to generate interference fringes with a period $\Lambda(z)$; wherein, during said scan, the step of changing the distance between phase mask and photosensitive waveguide portion is carried out in order to obtain an envelope $\Delta n(z)$ of the refractive index $n(z)$ along said z axis.

The pattern of the refractive index $n(z)$ to be obtained at the end of the writing process along a z axis of the waveguide, in particular the patterns of the mean local value $n_0(z)$, of the envelope $\Delta n(z)$ and of the period $\Lambda(z)$ of the refractive index $n(z)$ are advantageously predetermined before starting the process.

Preferably, the method also comprises the step, carried out during said scan, of changing the energy of the beam along said photosensitive waveguide portion so as to obtain said mean local value $n_0(z)$ Preferably, said step of changing the energy of the beam along said photosensitive waveguide portion comprises applying a variable attenuation to said beam during said scan.

The method can further comprise the step of reducing the size of said beam during said scan.

Said step of reducing the size of said beam can comprise transmitting said beam through a slit of a predetermined size.

Said step of scanning said beam can comprise the step of translating said slit.

Alternatively, said step of scanning said beam can comprise the steps of deflecting said beam by a mirror and translating said mirror in parallel to said portion of photosensitive waveguide.

As a further possibility, said step of scanning said beam can comprise translating said photosensitive waveguide portion along said z axis.

The method can further comprise the step of focusing said beam on said portion of photosensitive waveguide.

Said step of changing the energy of the beam along said photosensitive waveguide portion can alternatively comprise changing the speed of said scan.

In a second aspect thereof, the present invention relates to an apparatus for writing a Bragg grating in a waveguide, preferably an optical fibre, comprising:

an emitter of an ultraviolet radiation beam;

support elements of said waveguide for arranging a photosensitive waveguide portion in a writing position along a path of said beam;

a phase mask arranged along said path in such a position as to directly face said photosensitive waveguide portion when the latter is in writing position; and means for scanning the beam along said photosensitive waveguide portion through said phase mask;

and also comprising a moving device for changing the distance between said phase mask and said photosensitive waveguide portion during the scan of the beam.

Preferably, the apparatus comprises a device for controlling the intensity of the beam adapted to operate during the beam scan.

Said device for controlling the intensity of the beam can be an optical attenuator adapted to receive the beam from said emitter.

Preferably, said moving device comprises a first motorised translation stage.

The apparatus can also comprise a screen provided with a slit arranged along said path of the beam before said phase mask, said slit having a smaller size with respect to that of the section of said beam.

Said scanning means advantageously comprises a second motorised translation stage carrying said screen and having an orthogonal displacement direction with respect to said beam for arranging said slit in different points of the section of said beam.

Moreover, the apparatus can comprise a mirror for deviating said beam towards said photosensitive waveguide portion.

In this case, said scanning means preferably comprise a second motorised translation stage carrying said mirror and said screen and having a displacement direction parallel to said photosensitive waveguide portion.

The apparatus can advantageously comprise a control and processing unit adapted to control said scanning means, said moving device and/or a device for controlling the beam intensity, adapted to change said intensity during the scan of the beam.

Moreover, there can be at least one optical element for focusing said beam on said photosensitive waveguide portion.

Advantageously, the distance between said phase mask and said photosensitive waveguide portion is greater than 50 $\mu$m, preferably comprised between 100 $\mu$m and 1000 $\mu$m, more preferably comprised between 100 $\mu$m and 800 $\mu$m.

The divergence of said beam is preferably comprised between 0.5 and 1.5 mrad.

Said phase mask can advantageously be a periodic mask, and said emitter can advantageously be an excimer laser of the KrF type.

Said scanning means can alternatively comprise a motorised translation stage adapted to translate said photosensitive waveguide portion and said phase mask.

Said device for controlling the intensity of the beam can alternatively be a driving circuit of said emitter.

Said at least one optical element can comprise a cylindrical lens or, alternatively, a concave mirror.

BRIEF DESCRIPTION OF THE DRAWINGS

The invention will be described hereinafter with particular reference to the following figures, representing a preferred, non-limiting embodiment thereof.

DETAILED DESCRIPTION OF THE INVENTION

Figure 4:
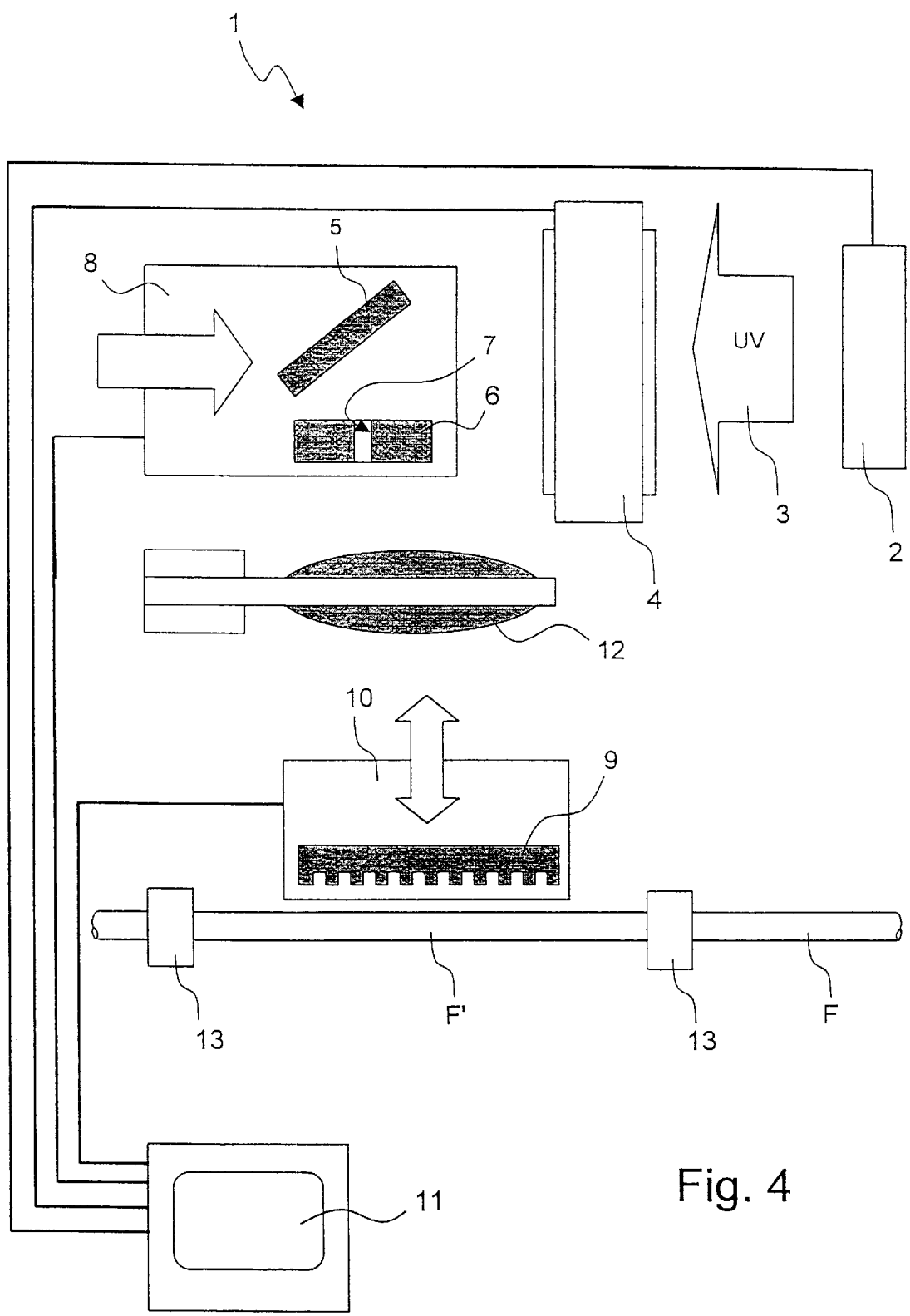
FIG. 4 shows a first embodiment of an apparatus for writing gratings according to the present invention.

In FIG. 4, reference numeral 1 refers as a whole to an apparatus for writing a Bragg grating in a waveguide, in the specific case an optical fibre F, mounted on an optical bench (not illustrated).

Apparatus 1 comprises a laser source 2 adapted to generate a laser beam 3 at a suitable ultraviolet wavelength $\lambda_{uv}$, a variable attenuator 4 adapted to attenuate the intensity of beam 3, a mirror 5 (for example, oriented at 45°) for deviating beam 3 towards fibre F, a screen 6 provided with a slit 7 for letting a predetermined fraction of the laser beam 3 pass, a first translation stage 8 adapted to translate mirror 5 and screen 6 in parallel to fibre F, a phase mask 9 arranged to face fibre F, and adapted to generate UV interference fringes from laser beam 3 (more precisely, from its fraction transmitted through slit 7), a second translation stage 10 adapted to translate the phase mask 9 in orthogonal direction with respect to fibre F and finally, a control and processing unit 11 (hereinafter shortly called processor) connected to laser source 2, to attenuator 4, and to translation stages 8 and 10 to control their operation.

Moreover, there is provided a cylindrical lens 12 (or more in general, one or more optical elements) preferably arranged between screen 6 and phase mask 9 and adapted to focus the laser beam 3 onto fibre F. More precisely, the cylindrical lens 12 is oriented with its focusing axis orthogonal to the axis of fibre F.

Finally, apparatus 1 comprises a pair of supports 13 of the known type, arranged on the optical bench at a predetermined mutual distance and adapted to support in rectilinear position the portion of fibre F on which the grating is to be written.

The laser source 2 can be, for example, a commercial Kr—F (krypton-fluorine) excimer laser with unstable resonator, operating at a central wavelength $\lambda_{uv}$=248 nm. This type of source can provide energy up to 450 mJ, and it can be pulse actuated up to a maximum repetition rate equal to 200 pps (pulses per second).

Attenuator 4 allows controlling the intensity of the laser beam 3, keeping the operating parameters of the laser source 2 constant. Attenuator 4 can be a typical attenuator adapted to operate with excimer lasers, for example a dual plate attenuator of the OPTEC AT4020 Energy Attenuator type, by the firm Optec s.a., Hornu, Belgium.

The first translation stage 8 must allow the displacement of mirror 5 and of screen 6 in parallel to fibre F for a distance substantially equal to the length of the grating to be created. Translation stage 8 preferably is a motorised translation stage that can be driven by processor 11, and it has a minimum step (displacement resolution) adapted to obtain the required resolution of the grating. For example, the first translation stage 8 can be the model M-UTM-50CC1-HL by the firm Newport, Irvine, Calif. (USA), which has a stroke of 50 mm, a maximum speed of 20 mm/sec and a displacement resolution of 1 $\mu$m.

The width of slit 6 is less than the size of beam 3 for reducing said size to much lower values than that of the phase mask 9. Slit 7 can for example have a width of 1.5 mm. Slit 7 must be sufficiently large so as not to cause diffraction phenomena, and sufficiently small to obtain the desired resolution of the grating.

The second translation stage 10 must allow the displacement of the phase mask 9 in orthogonal direction with respect to the axis of fibre F for a sufficient distance to guarantee the variations of visibility of the interference fringes needed for writing the grating. The second translation stage 10 can be, for example, the model M-UTM-25CC.1 by the firm Newport, Irvine, Calif. (USA), which has a displacement range of 25 mm and a displacement resolution of 0.1 $\mu$m.

The phase mask 9 preferably is a periodic mask with a period $\kappa_m$ adapted to generate periodic interference fringes with period $\Lambda=\Lambda_m/2$. The effective area of the phase mask 24 can have different shapes, for example it can be rectangular or circular. The phase mask 9 can be, for example, the model PM-248-1.066-25.4 by the firm Lasiris, Saint-Laurent, Quebec, Canada, which is adapted to be used with KrF excimer lasers. Said mask has an effective area of circular shape with diameter of 15 mm.

On processor 11 there is loaded a computation program, which—as described hereinafter—allows processing a plurality of initial parameters set by the operator, and consequently generating a plurality of driving signals for laser source 2, attenuator 4 and translation stages 8 and 10. More in detail, processor 11 is provided with a "Digital Input Output" card for sending the control signals to laser source 2 (thus defining a driving circuit therefor) and to attenuator 4, and with a "GPIB" (General Purpose Interface Bus) card for sending the control signals to translation stages 8 and 10.

Hereinafter the main parameters that must be set on processor 11 before starting the writing process are listed, together with ranges of typical values for said parameters:

| | |
|---|---|
| total writing time: | 100–300 sec; |
| grating length: | 5–20 mm; |
| width of slit 7 | 0.6–1.5 mm; |
| displacement step of the first translation stage 8: | 10–50 $\mu$m; |
| displacement step of the second translation stage 10: | 1–10 $\mu$m; | approximating function (through polynomial "fitting") of the experimental visibility curve;

parameters of the desired apodisation (for example, in the case of a modulation $\Delta n$ of the "super-gaussian" type normalised to zero at its ends, which may be expressed by the function:

$$\Delta n(z) \propto \frac{\exp\left\{-\left|\frac{z}{\sigma \cdot L}\right|^q\right\} - \exp\left\{-\left|\frac{1}{2\sigma}\right|^q\right\}}{1 - \exp\left\{-\left|\frac{1}{2\sigma}\right|^q\right\}} \quad (5)$$

where L is the grating length and $\sigma$ is the mean square deviation (normalised with respect to the grating length), the parameters to be set are $\sigma$ and the exponent q).

Apparatus 1 allows the creation of a fibre grating through the method described hereinafter.

In a preliminary step, processor 28 is pre-set with values of the above operating parameters adapted to the creation of a Bragg grating with predetermined characteristics, for example an apodised grating.

Afterwards, after having arranged the considered portion of optical fibre F in a writing position, that is, in a rectilinear position between the two supports 13, the laser source 2 is operated for the emission (with a predetermined intensity) of the laser beam 3. The latter passes through attenuator 4, undergoing an attenuation that is controlled moment by moment by processor 11. The attenuated beam 3 thus reaches mirror 5, which reflects it towards fibre F. Then, beam 3 passes through slit 7, which allows only a portion thereof to pass. Mirror 5 and slit 7 are translated by the first translation stage 8 in parallel to fibre F, with a motion law determined by processor 11 on the basis of the pre-set parameters. Said translation allows scanning the beam 3, that is to say, directing beam 3 (more precisely, its fraction exiting from slit 7) towards different longitudinal parts of the fibre F. Then, beam 3 passes through lens 12, which focuses it onto fibre F. From beam 3, the phase mask 9 generates interference fringes which, by impinging on the photorefractive portion of fibre F, change its refractive index. During this process of grating writing, the phase mask is translated by the second translation stage 10 (on the basis of the commands received from processor 11) from and to fibre F so as to modify the visibility of the interference fringes on the fibre F itself. Advantageously, during the entire writing process, the mask-fibre distance is more than 50 $\mu$m, preferably comprised between 100 $\mu$m and 1000 $\mu$m, more preferably comprised between 100 $\mu$m and 800 $\mu$m.

By independently actuating translation stages 8 and 10 and attenuator 4, it is possible to obtain the desired profile of refractive index onto fibre F and thus, it is possible to obtain a Bragg grating with the desired characteristics.

In fact, the spectral properties of a grating are determined by the profile of refractive index n along its z axis. The local refractive index n(z) can be expressed by the relation (2) introduced before, hereinafter rewritten for convenience of description:

$$n(z)=n_0(z)+\Delta n(z)\sin(2\pi z/\Lambda(z)) \quad (2)$$

where the first term $n_0(z)$ is the mean local refractive index and the second term is a modulation component having an envelope $\Delta n(z)$ and a pitch (or period) $\Lambda(z)$. In this case, the pitch $\Lambda(z)$ is constant and equal—as already said before—to half the period $\Lambda m$ of the phase mask 9. The envelope $\Delta n(z)$ can be in turn expressed as:

$$\Delta n(z)=n_0(z)\cdot v(z) \quad (6)$$

where v(z) is the visibility of the interference fringes, defined by the relation (4) written above.

Figure 1A:
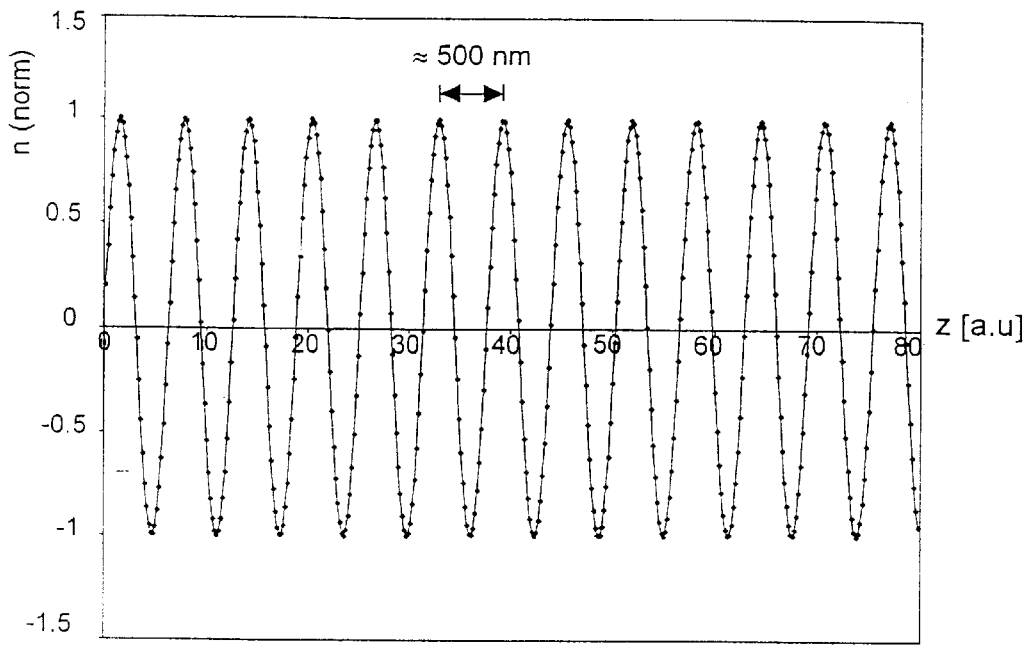
FIG. 1a shows the pattern of the refractive index (with respect to its mean value) in a uniform Bragg grating.
Figure 1B:
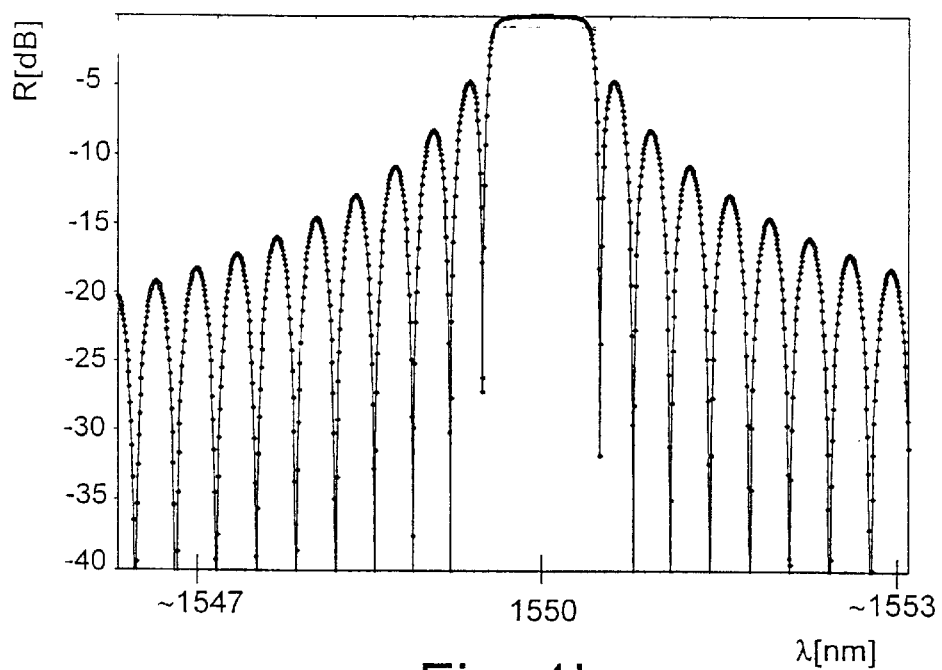
FIG. 1b shows a reflection spectrum of a uniform Bragg grating.
Figure 2A:
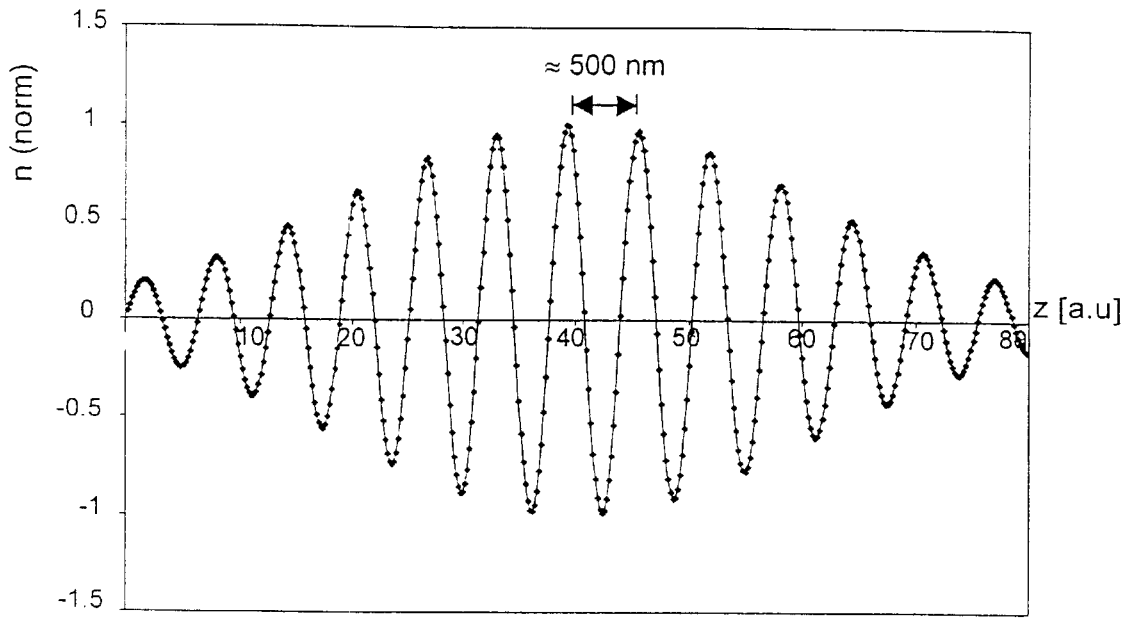
FIG. 2a shows the pattern of the refractive index (with respect to its mean value) in an apodised Bragg grating.
Figure 2B:
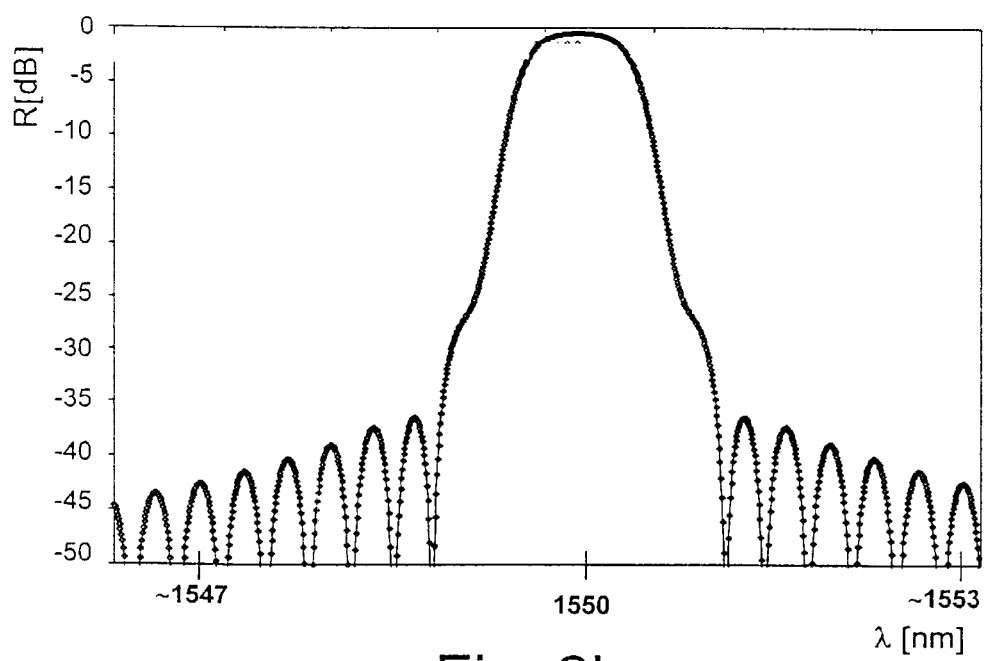
FIG. 2b shows a reflection spectrum of an apodised Bragg grating.
Figure 3A:
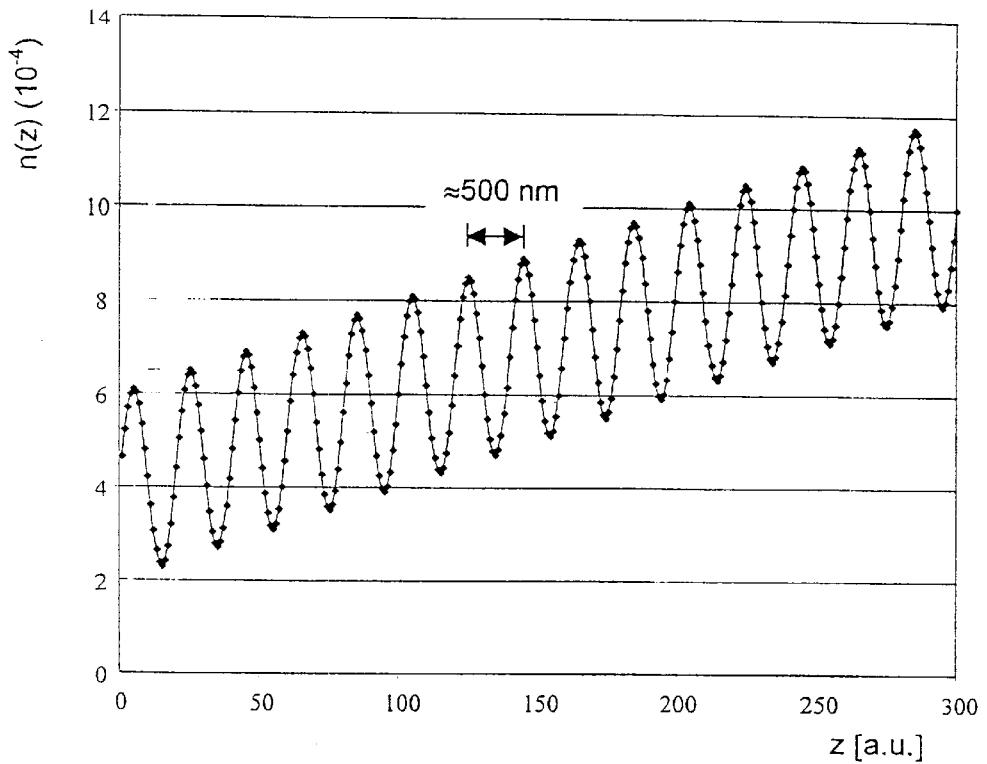
FIG. 3a shows the pattern of the refractive index in a chirped Bragg grating with variable mean refractive index.
Figure 3B:
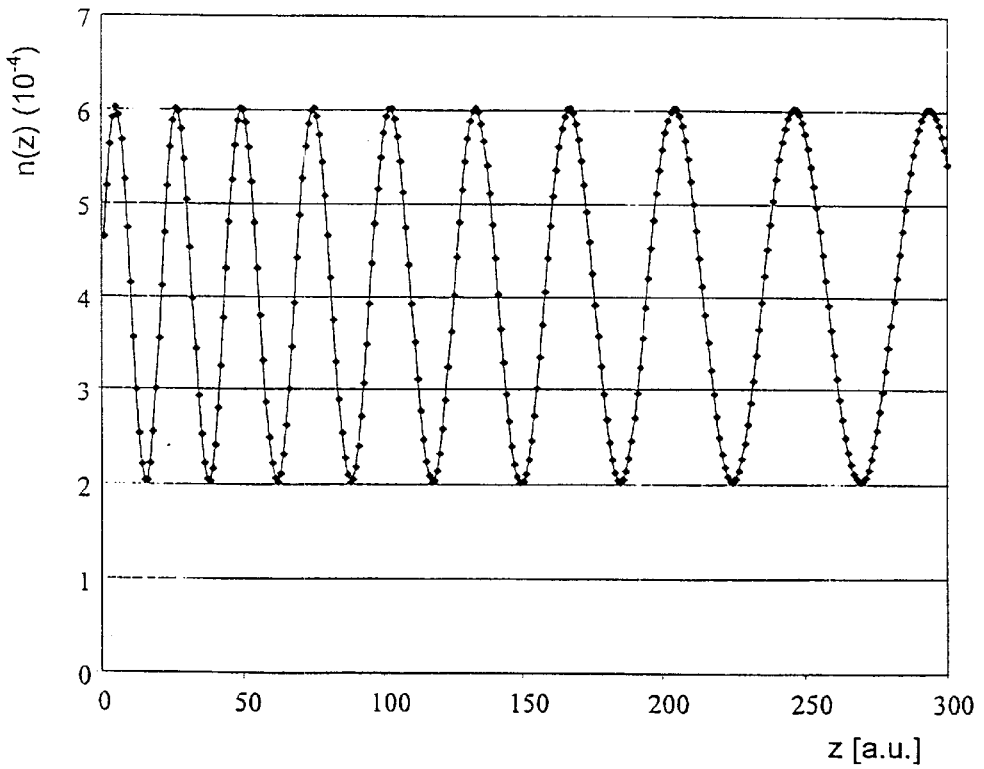
FIG. 3b shows the pattern of the refractive index in a chirped Bragg grating with variable spatial period.
Figure 3C:
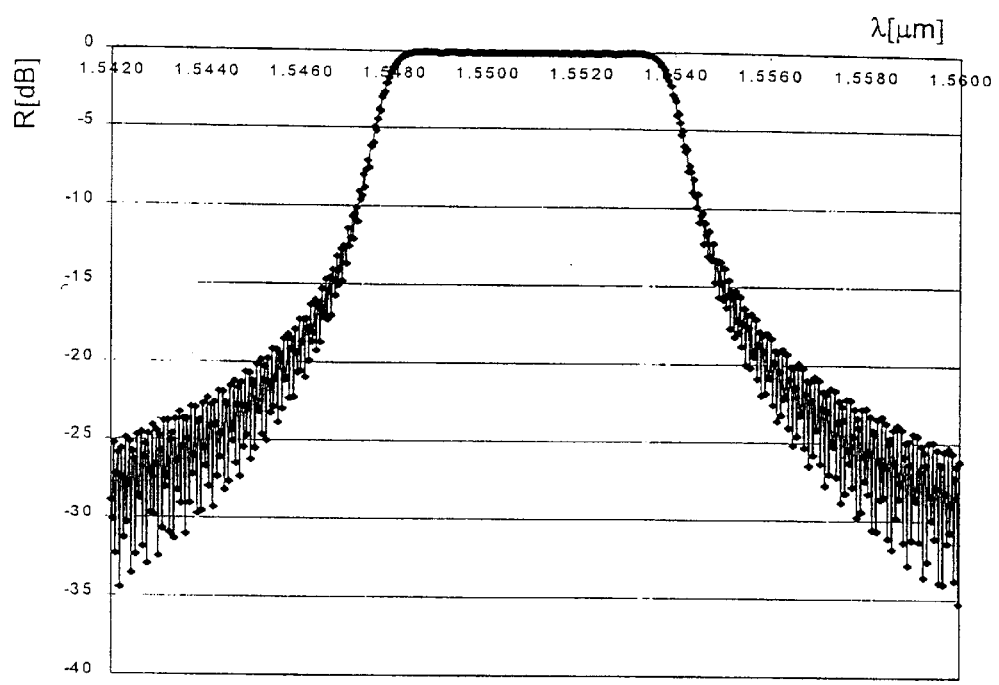
FIG. 3c shows a reflection spectrum of a chirped Bragg grating.

The particular pattern of the refractive index must be selected on the basis of the type of grating to be obtained. For example, a narrow-band apodised grating can be obtained by suitably modulating the envelope $\Delta n(z)$ and keeping $n_0(z)$ constant (as shown in FIG. 2*a*). A non-apodised chirped grating, on the other hand, can be obtained by changing the value $n_0(z)$, for example increasing it linearly along the axis of fibre F, and keeping $\Delta n(z)$ constant (as shown in FIG. 3*a*). To obtain apodised chirped gratings, on the other hand, it is necessary to change both $n_0(z)$ and $\Delta n(z)$ The local value of $n_o$ is univocally determined by the total energy that reaches the considered point of fibre F. It is thus possible to determine, for each point, the value of $n_0$ by suitably driving attenuator 4 through processor 11.

Moreover, in each writing point, the control of envelope $\Delta n$ is obtained by driving, through processor 11, the second translation stage 10 so as to suitably change the distance of the phase mask 9 from fibre F. In fact, by changing said distance in a controlled way it is possible to change the visibility v(z) of the interference fringes onto fibre F and thus, the value of Δn, in the desired way.

At the same time, the displacement of mirror 5 and of slit 6 by the first translation stage 8 allows changing, moment by moment, the writing point on the fibre. Moreover, by suitably controlling the speed of the first translation stage 8 it is possible to carry out a control of the energy of beam 3 reaching any writing point, in addition or in alternative to the control with attenuator 4 described before.

Thus, apparatus 1 of the invention allows a separate and local control (in the different points along the axis of fibre F) of the parameters $n_0(z)$ and $\Delta n(z)$ and thus, it allows obtaining a grating with the desired characteristics.

Figure 5:
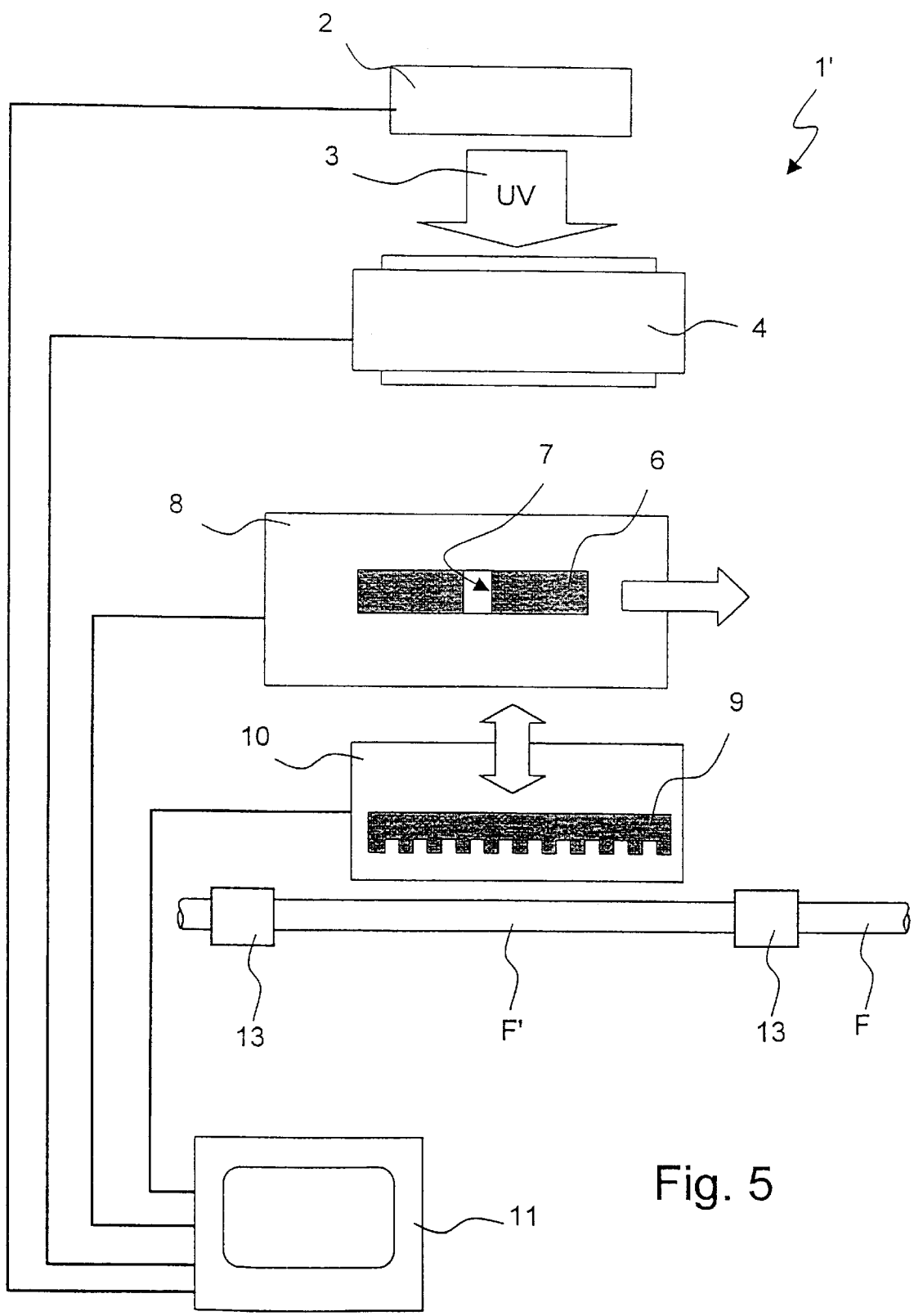
FIG. 5 shows a second embodiment of an apparatus for writing gratings according to the present invention.

FIG. 5 shows a further embodiment of the apparatus of the invention, herein referred to with reference numeral 1'. Apparatus 1' differs from apparatus 1 mainly in that the laser source 2 is oriented in such a way as to direct beam 3 directly onto fibre F (orthogonal to the same). Moreover, attenuator 4 is oriented in such a way as to attenuate beam 3 along said direction, and mirror 5 is missing. Thus, the first translation stage 8 is adapted to translate only screen 6 in parallel to fibre F to allow the illumination in subsequent instants of different parts of fibre F. Lens 12, which is preferably provided also in this embodiment, is not illustrated for convenience of representation. Differently from apparatus 1, wherein the reflection through mirror 5 and the concurrent translation of mirror 5 and of screen 6 allowed directing always the same fraction of beam 3 onto fibre F (preferably, a central fraction thereof), in apparatus 1' fibre F receives from slit 7 fractions of beam 3 that are always different, due to the displacement of the slit 7 itself in relation to beam 3 exiting from attenuator 4. Thus, the writing conditions for apparatus 1' are less uniform. Optionally, attenuator 4 can be driven so as to compensate for the variations of energy due to said irregular conditions.

Numerical Simulations

The Applicant carried out a first numerical simulation to check the dependence of the visibility of the fringes from the mask-fibre distance as the characteristics of the laser source 2 change. This simulation was carried out considering only the presence of fibre F, of the laser source 2 (oriented towards fibre F) and of the mask phase 9.

At first, the Applicant simulated the writing of a grating by a laser source 2 with emission at 248 nm, and considering three different values of the divergence of the laser beam 3, respectively 0.3, 1 and 3 mrad. Moreover, the period $\Lambda_m$ set for the phase mask was equal to 1 μm.

On the basis of the above parameters, the pattern of the interference fringes onto fibre F was determined (through Kirkhoff integral, even though the method known as "order method" could be equally used). For each value d of the mask-fibre distance, the Fourier transform of the function representative of the interference fringes was calculated; the visibility v(d) for said distance can be defined as F(1)/F(0), where F(1) is the amplitude of the first harmonic and F(0) is the amplitude of the fundamental component in the Fourier transform. This definition is more general than that provided by the relation (4), since the latter is valid only in the case of perfectly sinusoidal fringes. For the purpose of taking into account the finite size of the fibre core (wherein the grating is written), the visibility v(d) is averaged on a distance equal to the diameter $d_c$ of the core itself, according to the following expression (wherein ξ represents the current variable of the mask-fibre distance):

$$v(d) = \frac{\int_{d-d_c/2}^{d+d_c/2} v(\xi)d\xi}{d_c} \quad (7)$$

Figure 6:
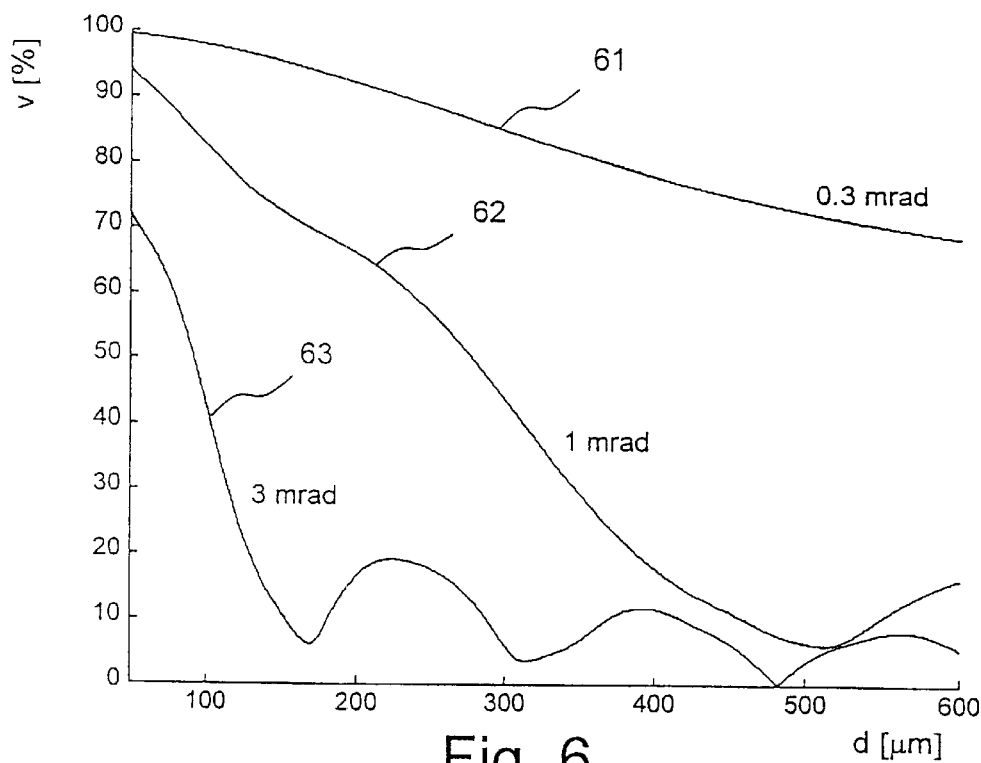
FIGS. 6, 7 show the results of numerical simulations.

With reference to FIG. 6, curves 61, 62 and 63 show the pattern of the function v(d) (where visibility v is expressed in % and distance d is expressed in μm) for values of divergence respectively equal to 0.3 mrad, 1 mrad and 3 mrad. As it can be noted, the visibility of the fringes significantly depends on distance d, and said dependence is a function of the divergence of the laser beam 3. Such results also show the importance of selecting a laser source with suitable divergence. In fact, in case of a divergence of 3 mrad, the trailing front of curve v(d) is relatively steep and therefore, small displacements of the phase mask 9 are associated to relatively high variations of the visibility, which is thus difficult to precisely control. On the contrary, in case of a divergence of 0.3 mrad, the curve decreases very slowly and thus, to have the desired variations of visibility, there must be significant displacements of the phase mask 9. Since—as known—the area of fibre F illuminated by the interference fringes decreases as the mask-fibre distance increases, the displacements of the mask must preferably be such as not to have more than 10% variation of the above area. Intermediate divergence values, preferably comprised between 0.5 and 1.5 mrad, allow obtaining patterns of the visibility as a function of the mask-fibre distance adapted to the purpose. In fact, as it can be noted in FIG. 6, the curve relating to the divergence value of 1 mrad shows a decreasing monotonic pattern (at least up to d=500 μm) and it has such a slope to obtain with a good control the desired visibility variations.

Under the same measurement conditions as the first simulation, and considering a beam divergence of 1 mrad, the Applicant carried out a second numerical simulation to verify the dependence of the visibility of the fringes on the mask-fibre distance as the quality of the phase mask 9 changes. In particular, three different phase masks were considered, having a transmission of the zero order respectively equal to 0%, 5% and 10%. The calculations of the visibility v(d) were carried out as before.

Figure 7:
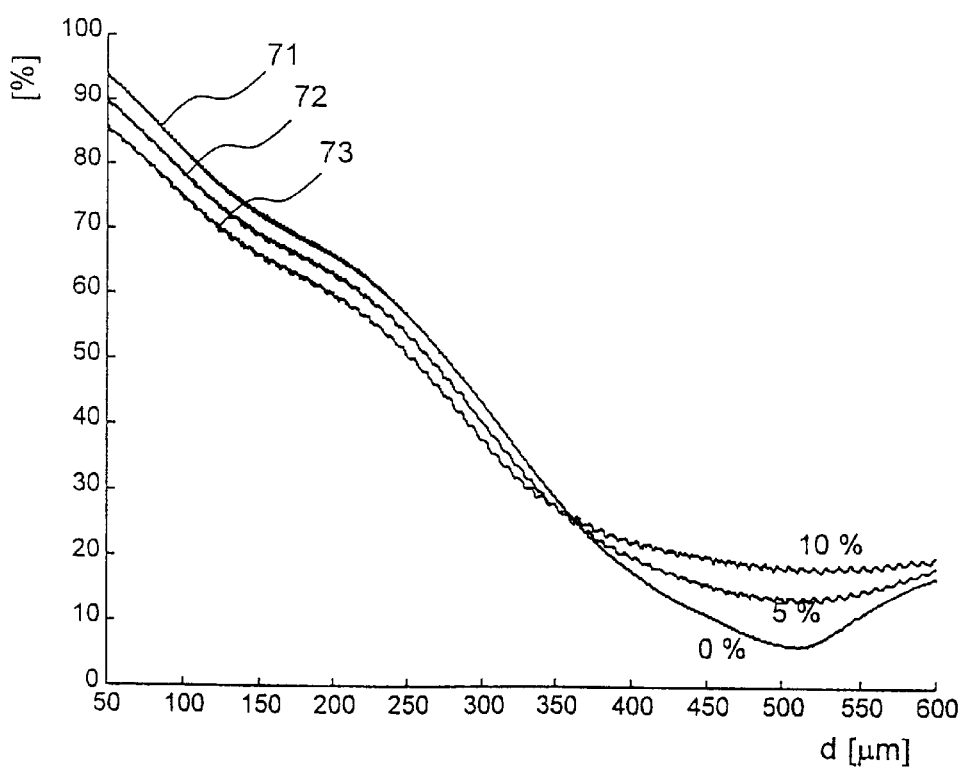

The results of this simulation are shown in FIG. 7. In particular, curves 71, 72 and 73 relate to values of the transmission of the zero order respectively equal to 0%, 5% and 10%. From the results shown in this figure, and considering that the phase masks typically available on the market have transmission values of the zero order not exceeding about 3%, it is evident that the visibility pattern is not significantly affected by the quality of the phase mask.

Experimental Tests

A first series of experimental tests was carried out to confirm the above dependence of the visibility v on the mask-fibre distance d. For these tests, the configuration of FIG. 4 was used, including a KrF excimer laser source 2 adapted to emit a laser beam 3 having a wavelength of 248 nm, an energy of 200 mJ and a pulse repetition rate of 50 pps (pulses per second). As described hereinafter, the divergence of beam 3 was measured afterwards. Moreover, an attenuator 4 operating with a transmissivity of 20%, a slit 7 of width of 1 mm and a phase mask 9 model PM-248-1.066-25.4 by the firm Lasiris, Saint-Laurent, Quebec, Canada, were used.

The tests were conducted by holding translation stages 8 and 10 standstill and writing different periodic gratings in different fibres, changing every time the mask-fibre distance d and obtaining at the end of each writing the visibility of the fringes of the obtained grating. In particular, the gratings were obtained by changing the distance d from 25 $\mu$m to 300 $\mu$m with 25-$\mu$m steps, from 300 $\mu$m to 600 $\mu$m with 50-$\mu$m steps, and from 600 $\mu$m to 900 $\mu$m with 100-$\mu$m steps. Thereafter, the maximum reflectivity $R_{max}$ obtained in a predetermined writing time, and the variation of reflection wavelength $\Delta\lambda$— which, as known, the grating undergoes because of the writing—were measured for each grating in a known way. From the value of $\Delta\lambda$, the value of $n_0$ was obtained through the known relation $n_0=\Delta\lambda/\Lambda_m$. To obtain the visibility, the parameters $R_{max}$ and $n_0$ were inserted in the following analytic formula of periodic gratings (obtainable, for example, from formulae (20) and (24) of the article by T. Erdogan, "Fiber grating spectra", Journal of Lightwave Technology, Vol. 15, No. 8, Aug. 1997, pages 1277–1294):

$$v = \frac{\mathrm{Tan}h^{-1}(\sqrt{R_{max}})}{L} \cdot \frac{\lambda}{\pi} \cdot \frac{1}{n_0} \qquad (7)$$

where L is the length of the grating and $\lambda$ is the wavelength of maximum reflection of the grating.

Figure 8:
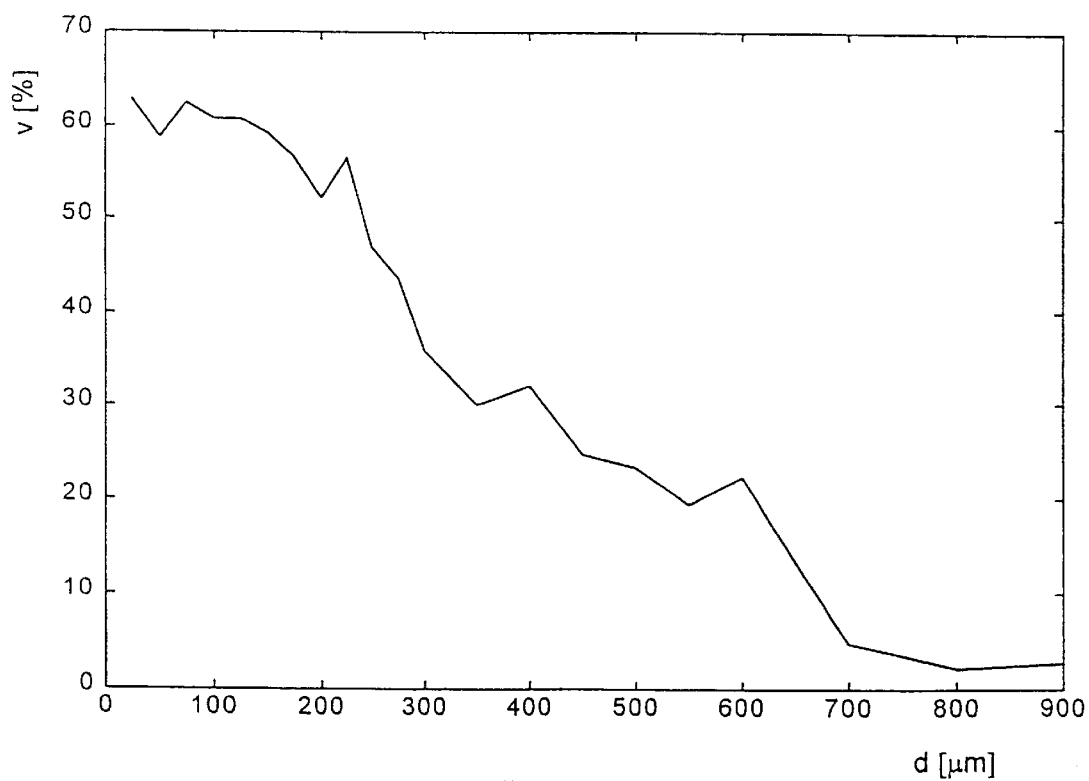
FIGS. 8, 9a, 9b show the results of experimental measurements.

FIG. 8 shows the result of such tests. From that curve it is possible to obtain, in a known way, an approximating function through a polynomial "fitting". As described hereinafter, said approximating function is input in processor 11 before starting the process of grating writing.

In a separate test, the divergence of the laser beam 3 was measured through a beam profiler of the known type, arranged in the focus of a cylindrical lens (according to a measurement set-up known in the art), obtaining a divergence value equal to about 0.8 mrad.

Said divergence value and the pattern of curve v(d) of FIG. 8 substantially confirm the results of the numerical simulations. Moreover, the essentially monotonic pattern of the curve allows associating each visibility value to a respective value of the mask-fibre distance.

A further experimental test was carried out for verifying the effectiveness of the apparatus of the invention in writing an apodised Bragg grating with a high suppression of the secondary lobes in the spectrum thereof. Also said test has been carried out with the configuration of FIG. 4, and setting the following parameters, before the test, on processor 11:

| total writing time: | 300 sec; |
|---|---|
| grating length: | 12 mm; |
| width of slit 7: | 1 mm; |
| displacement step of the first translation stage 8: | 20 $\mu$m; | approximating function (through polynomial "fitting") of the experimental visibility curve of FIG. 8;

parameters of the apodisation considering a "super-gaussian" pattern of the envelope $\Delta n$: mean square deviation (normalised to the grating length) $\sigma$ equal to 0.3 and exponent equal to 2.2.

Figure 9A:
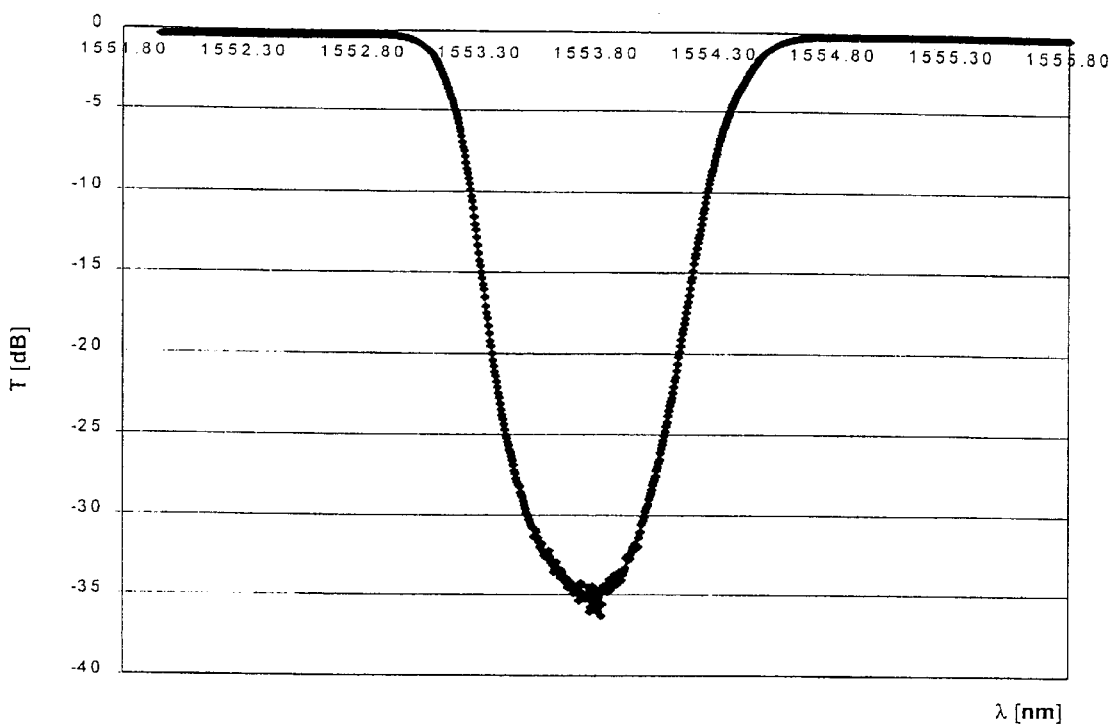
Figure 9B:
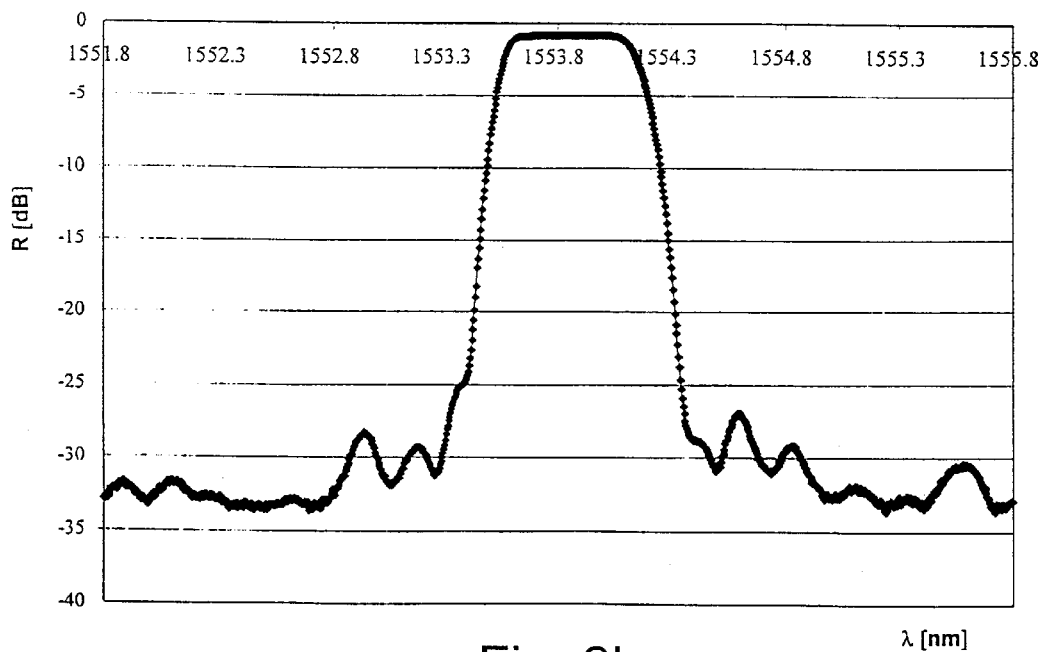

FIGS. 9a and 9b respectively illustrate the transmission and the reflection spectrum (in dB) of the grating thus obtained, having a length of 12 mm and a gaussian apodisation. From the reflection spectrum, it can be noted that the secondary lobes have a particularly reduced height, at least 25 dB less than that of the main lobe.

It is evident that, even though the apparatus and the method of the invention are especially suitable for the creation of apodised gratings, the same are usable for writing non-apodised gratings without structural or conceptual modifications. For example, for writing apodised or non-apodised chirped gratings, it is sufficient to impose a linear pattern to the mean refractive index $n_0$, acting on the total energy sent to the fibre. Alternatively, using a chirped phase mask, it is possible to create an apodised chirped grating, wherein the apodisation is carried out with the technique illustrated above, keeping the intensity of the UV beam constant.

Finally, it is evident that other modifications, variants, replacements and integrations can be made to the embodiments described above, without thus departing from the scope of the present invention.

For example, in the configuration of FIG. 4, screen 6 could be arranged between the cylindrical lens 12 and the phase mask 9, and be carried by a support integral with the first translation stage 8. In this case, it is possible to have a particularly reduced distortion of beam 3 reaching the phase mask 9.

As a further alternative, screen 6 could be arranged, in fixed position, between attenuator 4 and mirror 5. This arrangement of screen 6 is to be regarded as less preferred since by increasing the distance between the latter and the phase mask 9, there is a greater distortion of beam 3 reaching the phase mask 9 itself.

Optionally, attenuator 4 could be missing, in which case the control of the energy of beam 3 could be obtained by changing, during the process, the operating conditions of the laser source 2.

Moreover, as an alternative to the scan of beam 3 being carried out through the movement of mirror 5 and of screen 6, as in the case of the arrangement of FIG. 4, or of the screen 6 alone, as in the case of the arrangement of FIG. 5, it is possible to scan the beam 3 onto fibre F translating the fibre F along its axis, together with the phase mask 9 and with supports 13, by a special translation stage (not illustrated).

Moreover, the laser source 2 could be of any type allowing a modulation of the visibility of the fringes through the modulation of the mask-fibre distance.

Moreover, rather than by lens 12 (or other equivalent optical element), the focusing of beam 3 onto fibre F could be carried out by a concave mirror or by a reflecting surface of any other shape, to be used in place of mirror 5.

As an alternative to an optical fibre F, the waveguide on which the grating is to be written could be an integrated optical waveguide.

Finally, instead of processor 11, a microcontroller could be used.

What is claimed is:

1. A method for writing a Bragg grating in a photosensitive waveguide portion, the method comprising:

generating an ultraviolet radiation beam;

providing a translation stage including a mirror and a screen, the screen including a slit along the beam path;

deflecting said beam with the mirror and through the slit, displacing said translation stage parallel to said photosensitive waveguide portion to direct said deflected beam through a phase mask directly facing said photosensitive waveguide portion, and along a z axis of said photosensitive waveguide portion; and, changing the distance between said phase mask and said photosensitive waveguide portion during said displacing.

2. The method according to claim 1, further comprising changing the energy of the beam along said photosensitive waveguide portion during said displacing.

3. Method according to claim 2, wherein changing the energy of the beam along said photosensitive waveguide portion comprises applying a variable attenuation to said beam during said displacing.

4. The method according to any one of claims 1–3, comprising transmitting said beam through a slit of a predetermined size.

5. The method according to claim 4, wherein displacing said translation stage comprises translating said slit.

6. The method according to any one of claims 1–3, further comprising focusing said beam on said portion of said photosensitive waveguide.

7. The method according to claim 2, wherein changing the energy of the beam along said photosensitive waveguide portion comprises changing the speed of said displacing.

8. An apparatus for writing a Bragg grating in a waveguide, comprising:

an emitter of an ultraviolet radiation beam;

support elements of said waveguide for arranging a photosensitive waveguide portion in a writing position along a path of said beam;

a phase mask arranged along said path in such a position as to directly face said photosensitive waveguide portion when the photosensitive waveguide portion is in writing position;

means for scanning the beam along said photosensitive waveguide portion through said phase mask;

a screen having a slit arranged along said path before said phase mask;

a motorized translation stage carrying said screen and having an orthogonal displacement direction with respect to said beam for arranging said slit in different points of the section of said beam; and, a moving device for changing the distance between said phase mask and said photosensitive waveguide portion during the scanning of the beam.

9. The apparatus according to claim 8, further comprising a device for controlling the intensity of the beam adapted to change said intensity during the scanning of the beam.

10. The apparatus according to claim 9, wherein said device for controlling the intensity of the beam is an optical attenuator adapted to receive the beam from said emitter.

11. The apparatus according to claim 8, wherein said moving device comprises a motorized translation stage.

12. The apparatus according to claim 8, further comprising a mirror for deviating said beam towards said photosensitive waveguide portion.

13. The apparatus according to claim 8, wherein said motorized translation stage also carries a mirror for deviating said beam towards said photosensitive waveguide portion.

14. The apparatus according to claim 8, further comprising at least one optical element for focusing said beam onto said photosensitive waveguide portion.

15. The apparatus according to claim 8, wherein said waveguide is an optical fibre.

16. The apparatus according to claim 8, wherein the distance between said phase mask and said photosensitive waveguide portion is between 100 $\mu$m and 1000 $\mu$m.

* * * * *